(12) United States Patent
Shao et al.

(10) Patent No.: US 10,917,399 B2
(45) Date of Patent: Feb. 9, 2021

(54) METHOD AND DEVICE FOR DISTRIBUTING SERVICE OBJECTS

(71) Applicant: Advanced New Technologies Co., Ltd., Grand Cayman (KY)

(72) Inventors: Pu Shao, Hangzhou (CN); Yanchun Zhu, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 459 days.

(21) Appl. No.: 15/018,499

(22) Filed: Feb. 8, 2016

(65) Prior Publication Data

US 2016/0234192 A1 Aug. 11, 2016

(30) Foreign Application Priority Data

Feb. 9, 2015 (CN) .......................... 2015 1 0068080

(51) Int. Cl.
*H04L 29/06* (2006.01)
*G06Q 30/06* (2012.01)

(52) U.S. Cl.
CPC ....... *H04L 63/083* (2013.01); *G06Q 30/0609* (2013.01)

(58) Field of Classification Search
CPC ....... H04L 63/083; H04L 9/3226; H04L 9/00; H04L 29/06; H04L 63/0815;
(Continued)

(56) References Cited

U.S. PATENT DOCUMENTS 6,327,573 B1 12/2001 Walker et al.
8,589,267 B2 11/2013 Hurst
(Continued)

FOREIGN PATENT DOCUMENTS

CN 1845160 A 10/2006
CN 103973769 A 8/2014
(Continued)

OTHER PUBLICATIONS

PCT Search Report and Written Opinion dated May 2, 2016 for PCT Application No. PCT/US16/17009, 8 pages.
(Continued)

*Primary Examiner* — Ashokkumar B Patel
*Assistant Examiner* — Quazi Farooqui
(74) *Attorney, Agent, or Firm* — Lee & Hayes, P.C.

(57) ABSTRACT

A method including, when a first extraction request that includes a primary password and is initiated by a first user is received, acquiring an object set corresponding to the primary password, and binding the first user to the object set; generating a secondary password corresponding to the object set, and returning a request response including the secondary password to the first user, so that the first user displays the secondary password to another user; and when a second extraction request that includes the secondary password and is initiated by a second user is received, distributing the object set to the first user according to a processing result of the second extraction request. The technical solution of the present disclosure implement service processing based on multiple levels of passwords.

20 Claims, 8 Drawing Sheets

(58) Field of Classification Search
CPC ........... H04L 63/0861; G06Q 30/0609; G06Q 30/06; G06Q 20/223; G06F 21/00
USPC ............................................. 726/1–8, 16–19
See application file for complete search history.

(56) References Cited

U.S. PATENT DOCUMENTS

| | | | |
|---|---|---|---|
| 2004/0167971 A1* | 8/2004 | Manolis | H04N 1/217 709/217 |
| 2005/0086177 A1* | 4/2005 | Anderson | G06K 19/06196 705/64 |
| 2005/0210413 A1* | 9/2005 | Quek | H04N 1/603 715/838 |
| 2006/0173789 A1* | 8/2006 | Baumert | G06F 21/10 705/59 |
| 2007/0055733 A1* | 3/2007 | Maruyama | H04L 51/00 709/206 |
| 2008/0077809 A1* | 3/2008 | Hayler | G06F 12/1466 713/193 |
| 2010/0280921 A1* | 11/2010 | Stone | G06Q 30/0603 705/27.1 |
| 2011/0196725 A1* | 8/2011 | Malcolmson | G06Q 30/02 705/14.16 |
| 2012/0272295 A1 | 10/2012 | Patton et al. | |
| 2012/0316939 A1 | 12/2012 | Moshfeghi | |
| 2013/0132169 A1 | 5/2013 | Dooley et al. | |
| 2013/0324218 A1 | 12/2013 | Thacker et al. | |
| 2014/0129428 A1* | 5/2014 | Tyler | G06Q 20/3226 705/39 |
| 2014/0325337 A1 | 10/2014 | McWeeney | |
| 2016/0191499 A1* | 6/2016 | Momchilov | H04L 63/0815 713/171 |
| 2016/0335684 A1* | 11/2016 | You | H04L 67/42 |

FOREIGN PATENT DOCUMENTS

| | | |
|---|---|---|
| CN | 104144197 A | 11/2014 |
| CN | 104252613 A | 12/2014 |
| JP | 2003168007 A | 6/2003 |
| JP | 2008257334 A | 10/2008 |
| JP | 2010250363 A | 11/2010 |
| JP | 2012145983 A | 8/2012 |
| JP | 2013182446 A | 9/2013 |
| KR | 20130095801 A | 8/2013 |
| KR | 20140043137 A | 4/2014 |

OTHER PUBLICATIONS

The Chinese Second Office Action dated May 15, 2019 for Chinese Patent Application No. 201510068080.9, 7 pages.

Machine translated Chinese Office action dated Dec. 6, 2018 for Chinese Patent Application No. 201510068080.9, 13 pages.

The Japanese Office Action dated Jun. 11, 2019 for Japanese Patent Application No. 2017-535995, a counter part of U.S. Appl. No. 15/018,499, 18 pages.

The Korean Office Action dated Jun. 19, 2019 for Korean Patent Application No. 2017-7021703, a counterpart of U.S. Appl. No. 15/018,499, 9 pages.

Kumacha, "What is the Three-Tier System? (Meaning/Commentary)—the Best Way to Earn Money from Points-Based Reward Website", retrieved on May 31, 2019 at <https://web.archive.org/web/20141203131856/http://mottokasegeru.seesaa.net/article/382220177.html>, Dec. 3, 2014, 4 pages.

Translated Korean Office Action dated Oct. 22, 2019 for Korean Patent Application No. 2017-7021703, a counterpart of U.S. Appl. No. 15/018,499, 2 pages.

The Korean Office Action dated Oct. 22, 2019 for Korean Patent Application No. 2017-7021703, a counterpart of U.S. Appl. No. 15/018,499, 3 pages.

Office Action dated Oct. 8, 2020 by the Indian Patent Office in Application 201717022333, a counterpart foreign application of U.S. Appl. No. 15/018,499, 7 pages.

Indian Office Action dated Oct. 8, 2020 for Indian Patent Application No. 201717022333, a counterpart foreign application of U.S. Appl. No. 15/018,499, 7 pages.

Singaporean Office Action dated Sep. 23, 2020 for Singaporean Patent Application No. 10201907122U, a counterpart foreign application of U.S. Appl. No. 15/018,499, 8 pages.

* cited by examiner

WHEN FIRST EXTRACTION REQUEST THAT INCLUDES PRIMARY PASSWORD AND IS INITIATED BY FIRST USER IS RECEIVED, ACQUIRE OBJECT SET CORRESPONDING TO PRIMARY PASSWORD, AND BIND FIRST USER WITH THE OBJECT SET
302

GENERATE SECONDARY PASSWORD CORRESPONDING TO OBJECT SET, AND RETURN REQUEST RESPONSE INCLUDING SECONDARY PASSWORD TO CLIENT TERMINAL OF FIRST USER, SO THAT CLIENT TERMINAL OF FIRST USER DISPLAYS SECONDARY PASSWORD TO ANOTHER USER
304

WHEN SECOND EXTRACTION REQUEST THAT INCLUDES SECONDARY PASSWORD AND IS INITIATED BY CLIENT TERMINAL OF SECOND USER IS RECEIVED, PERFORM PROCESS FOR DISTRIBUTING OBJECT SET TO FIRST USER ACCORDING TO PROCESSING RESULT OF THE SECOND EXTRACTION REQUEST
306

FIG. 3

METHOD AND DEVICE FOR DISTRIBUTING SERVICE OBJECTS

CROSS REFERENCE TO RELATED PATENT APPLICATION

This application claims foreign priority to Chinese Patent Application No. 201510068080.9 filed on 9 Feb. 2015, entitled "Method and Apparatus for Service Implementation", which is hereby incorporated by reference in its entirety.

TECHNICAL FIELD

The present disclosure relates to the field of service implementation technologies, and, more particularly, to a service implementation method and apparatus.

BACKGROUND

As the network technologies develop, diversified service implementation manners emerge. For example, the red envelope in China contains money, greeting card, or gift card and a person give the red envelope to another person for best wishes. By using a virtual item interaction in the form of a "red envelope" as an example, a user may put an electronic greeting card, a money gift and the like into a "red envelope" in electronic form, and designate each distribution object, thereby implementing distribution of the "red envelope". For example, the red envelope may be represented as an icon of envelope and if a user clicks the icon, electronic gift will be displayed.

However, in the process of the conventional service implementation, with respect to service objects, communication between a service initiator and a service receiver is generally performed based on a service address (for example, a URL) or two-dimensional information including a service address, so that the service implementation process is complicated.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an example service implementation method and apparatus, which simplifies the process of service implementation. To implement the above objective, the present disclosure provides the following technical solutions:

According to a first aspect of the present disclosure, an example service implementation method is provided, including:

when a first extraction request that includes a primary password and is initiated by a first user is received, acquiring an object set corresponding to the primary password, and binding the first user to the object set;

generating a secondary password corresponding to the object set, and returning a request response including the secondary password to the first user, so that the first user displays the secondary password to another user; and when a second extraction request that includes the secondary password and is initiated by a second user is received, performing processing on distributing the object set to the first user according to a processing result of the second extraction request.

According to a second aspect of the present disclosure, an example service implementation apparatus is provided, including:

a primary password processing unit that, when a first extraction request that includes a primary password and is initiated by a first user is received, acquires an object set corresponding to the primary password, and binds the first user to the object set;

a request responding unit that generates a secondary password corresponding to the object set, and returns a request response including the secondary password to the first user, so that the first user displays the secondary password to another user; and a secondary password processing unit that, when a second extraction request that includes the secondary password and is initiated by a second user is received, performs processing on distributing the object set to the first user according to a processing result of the second extraction request.

As shown from the above technical solutions, the present disclosure implements a service by passwords, and each user uses a primary password may introduce more users to enter the service by using a secondary password, thereby implementing expansion of service objects, helping increasing the amount of data interaction, and improving the interaction efficiency. Meanwhile, the process of service implementation is simple, and the service may be implemented by only using passwords as interfaces for the service implementation.

BRIEF DESCRIPTION OF THE DRAWINGS

FIG. 3 is a flow chart of an example service implementation method according to an example embodiment of the present disclosure;

DETAILED DESCRIPTION

Figure 1:
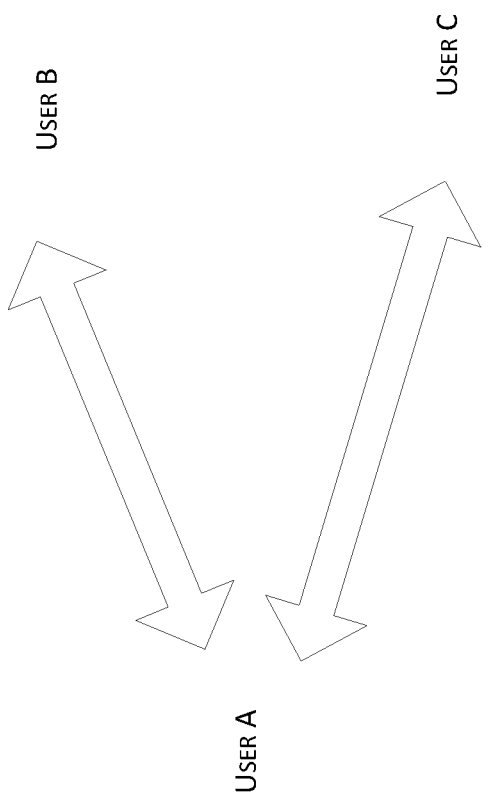
FIG. 1 is a schematic diagram of an application scenario in related techniques.

FIG. 1 is a schematic diagram of a scenario in service implementation. In the technical solution of the embodiment of the present disclosure, related services may be implemented between different users, for example, implementing "red envelope" distribution services, "coupon" distribution services, and the like. The red envelope distribution service may specifically refer to that of a user giving his/her own funds or other virtual items to other users by distributing red envelopes. In the conventional techniques, when related services are implemented, it generally requires that a service initiator user knows an accurate service receiver user. Moreover, a URL address generally needs to be generated, or a two-dimensional code including a URL is generated to notify the service receiver user, and the implementation process is very complicated. For example, in a scenario shown in FIG. 1, if a user A intends to implement data interaction with a user B, a user C and the like by using a "red envelope" distribution service as an example, the user A must designate the user B, the user C and the like as target objects one by one, and a large amount of User A's time resources will be consumed when the number of users is large. At the same time, the designation of the user A on the user B, the user C and the like is based on a premise that the user B, the user C and the like are associated users of the user A. For example, the user B, the user C and the like need to be recorded in the contacts of the user A as "friends" or the like; meanwhile, in this process, the service receiver user, for example, the user B and the user C further need to access and implement corresponding services according to a service link such as a URL or a two-dimensional code, of the services initiated by the user A. Therefore, the service implementation process is relatively complicated.

The present disclosure provides an example service implementation method and apparatus to implement a related service, such as a red envelope service or other service that may be implemented via a network, in a simplified manner.

Figure 2:
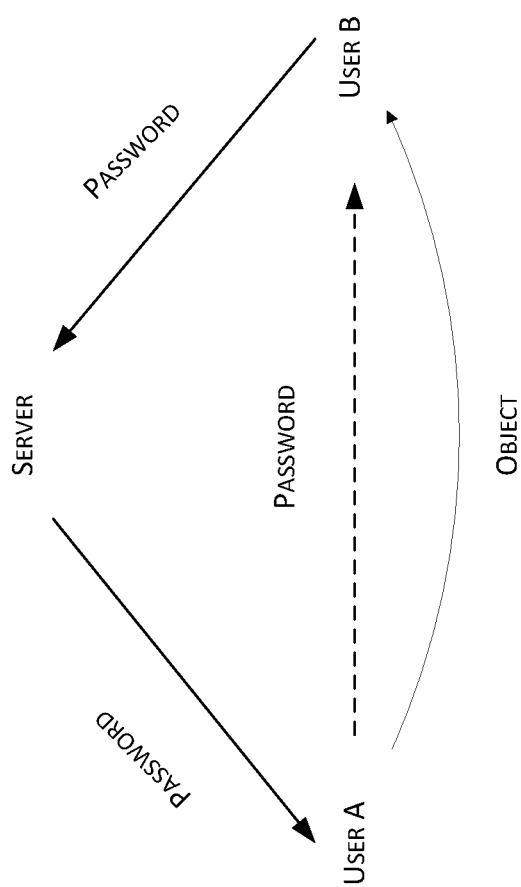
FIG. 2 is a schematic diagram of a service implementation in the related techniques.

In the example embodiment of the present disclosure, a related service may be implemented based on a password. For example, as shown in FIG. 2, in the process of service implementation, a "password" may be used as a medium, or may be used as a service interface, thereby implementing an interaction between the user A and the user B. For example, after the user A initiates a request to a server, the server generates an associated password for an object requiring interaction, and delivers the password to the user A; the user A may display the password to the user B in any manner such as direct sending, sharing to a social networking platform, or dictating. Then, when the user B initiates a request including the password to the server, an associated interaction object may be obtained.

As shown, in the process of service implementation based on a password, the interaction process is simpler and more flexible. However, only the user A executes password transmission, which is limited in some situations. For example, with respect to a service that needs more users to participate in, it is simple to only require the user A to transmit the password, but the increase of the number of users receiving the password is slow, which is not beneficial to the service implementation. Therefore, in the process of implementing the service based on the password, the service implementation method and apparatus provided in the present disclosure further improve the expansion speed and scope of service objects by using a secondary password.

FIG. 3 is a flow chart of an example service implementation method according to an example embodiment of the present disclosure, and as shown in FIG. 3, the method is applied to a server, and may include the following operations:

At 302: When a first extraction request that includes a primary password and that is initiated by a first user is received, an object set corresponding to the primary password is acquired, and the first user is bound with the object set.

In this example embodiment, an object may be interaction data in any form. For example, the object may be a virtual item, such as a coupon, an electronic greeting card, and a money gift. Correspondingly, the object set may be a set of virtual items. It may be understood that, with respect to different service implementations, the virtual object corresponds to corresponding service. For example, in a payment service, a preset object may be fund. When a merchant initiates a commodity activity service, the preset object may be a coupon, and the like.

In this example embodiment, an object set group corresponding to the primary password may be determined first, each object set group including at least one object set. Then an object set group is selected in accordance with a predefined distribution rule, and the object set bound with the first user is selected from the selected object set group.

In this example embodiment, the primary password or the secondary password may be in a form of character string, the character string may include one bit or multiple bits of characters, and each bit of character may be in any form such as a numeral, a letter, a Chinese character, or a symbol. The number of characters and a combination of the characters included in the primary password or secondary password may be determined according to the actual requirement or configuration solution.

At 304: A secondary password corresponding to the object set is generated, and a request response including the secondary password is returned to a client terminal of the first user, so that the client terminal of the first user displays the secondary password to another user.

For example, the request response may directly include the secondary password, and the first user may directly acquire, from the request response, a character string constituting the secondary password.

For another example, the request response may include a link used to acquire the secondary password, and in this case, it is equivalent to that the secondary password is indirectly included in the request response. Then, the first user may access the link to acquire the corresponding secondary password and acquire the character string constructing the secondary password.

For still another example, a display picture including the secondary password may be generated, and the display picture may be included in the request response. Certainly, based on the acquired character string of the secondary password, the device of the first user may voluntarily generate a corresponding display picture, so as to display to another user.

At 306: When a second extraction request that includes the secondary password and is initiated by a client terminal of a second user is received, process for distributing the object set to the first user is performed according to a processing result of the second extraction request.

In this example embodiment, the second user refers to "another user" different from the first user, and may represent one or more "other users".

In this example embodiment, by associating the distribution process of the object set to the first user with a processing result of the second extraction request, the first user will pay more attention to transmission and displaying of the secondary password, thereby being helpful to the expansion of the service object.

In this example embodiment, when second extraction requests initiated for a preset number of second users are all processed, objects in the object set are distributed to the first user and the preset number of second users. Alternatively, when second extraction requests initiated for a preset number of second users are all processed, objects in the object set are distributed to the first user.

In this example embodiment, the processing of the second extraction request may include: binding the second user to the object set corresponding to the secondary password according to the secondary password included in the second extraction request. When each second user is bound with the object set, the number of objects in the object set may be increased in accordance with a preset proportion. Alternatively, the processing of the second extraction request may include: processing the secondary password in the second extraction request as the primary password.

Figure 4:
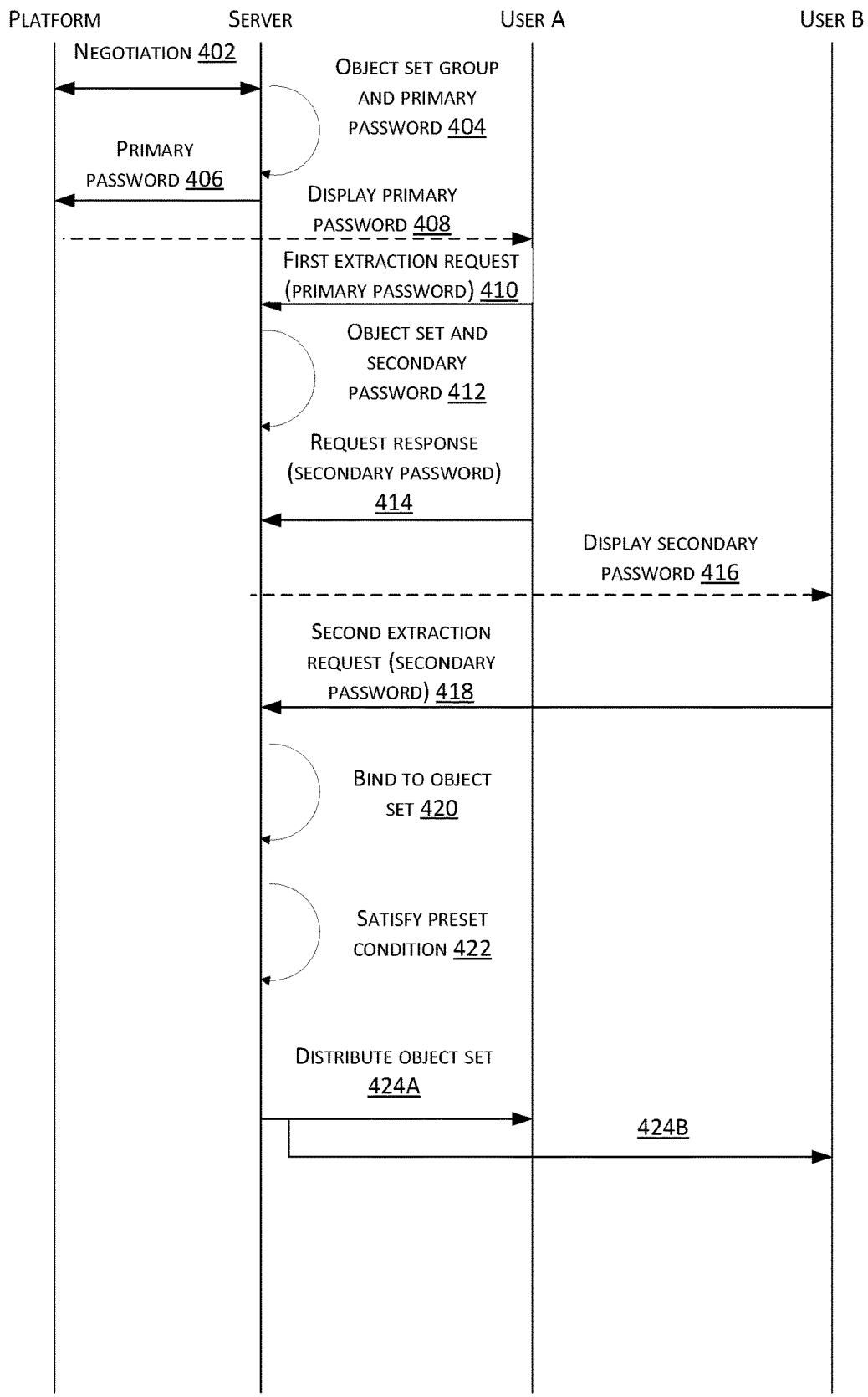
FIG. 4 is a flow chart of another service implementation method according to an example embodiment of the present disclosure.

Multiple parties involved in the technical solution based on the present disclosure are described in detail with reference to FIG. 4. FIG. 4 is a flow chart of another example service implementation method according to an example embodiment of the present disclosure, and as shown in FIG. 4, the method may include the following steps:

At 402: A platform and a server perform service negotiation.

In this example embodiment, the "platform" is any account that provides an object set, and it may be a personal account, for example, a user x; or, it may also be an enterprise account, such as "XX television station".

In this example embodiment, when the platform and the server perform negotiation, the negotiation content may include the following content: the number of object set groups, the number of object sets included in each object set group, the number of objects included in each object set, and distribution rules of the object set groups, the object sets or the objects. The platform may add the above content to a negotiation message and send the message to the server, so as to implement notification.

At 404: The server determines, according to a negotiation result, an object set group and a primary password associated with the object set group.

In this example embodiment, the distribution of "red envelopes" is used as an example, the object set group is a group of electronic item sets such as a group of gift sets in electronic form. For instance, the object group is "red envelope group". The object set is an electronic item set, included in the group of electronic item sets, such as a gift set in electronic form. For instance, the gift set is "red envelope" included in each "red envelope group". The object is an electronic item, included in the electronic item set, such as a gift in electronic form. For instance, the object is a gift card or a money gift in electronic form in each "red envelope".

In this example embodiment, when association of the object set group and the primary password is implemented, the primary password may be associated with a part or all of object set groups. In the negotiation result, the association method may be defined.

At 406: The server returns the primary password to the platform.

At 408: The platform displays the primary password to a user. It is assumed that a user A acquires the primary password.

In this example embodiment, the platform may display the primary password to the user in various methods such as video playing, sound broadcasting and presenter dictating through a channel such as a television program, a radio program, and a video website. Alternatively, the platform may also display the primary password to the user in various methods such as sending a short message to the user and sharing on a social networking platform.

In this example embodiment, the primary password may have a certain life cycle, for example, 5 minutes, and after the life cycle expires, the server may delete an association relationship between the primary password and the object set group, and recycle the primary password. The server may store the recycled primary password in a recycle database, and the primary password may be selected directly from the recycle database for use, thereby omitting the process of generating the primary password.

At 410: The client terminal of the user A sends a first extraction request to the server, the first extraction request including the primary password.

At 412: The server acquires an object set group corresponding to the primary password, binds the user A to an object set therein, and further generates a secondary password associated with the object set.

In this example embodiment, when the primary password only corresponds to one object set group and the object set group only includes one object set, the object set is directly bound with the user A. When the primary password corresponds to multiple object set groups, or one corresponding object set group includes multiple object sets, one or more object sets may be selected therefrom according to a predefined distribution rule, to be bound with the user A.

At 414: The server returns a request response including the secondary password to the user A.

In this example embodiment, the secondary password may be a character string, the character string may include one bit or multiple bits of characters, and each bit of character may be in any form such as a numeral, a letter, a Chinese character or a symbol. Certainly, the secondary password should be different from the primary password, so as to ensure the uniqueness of the password. Then, the server may directly include the character string of the secondary password in the request response, and send the request response to the user A. Alternatively, the server may generate a display picture including the secondary password, and send the display picture to the user A.

When the display picture is generated, the server may generate the display picture statically based on a pre-defined fixed template. Alternatively, multiple templates may be pre-defined, the server may generate a template ID corresponding to the current secondary password, and acquire a picture attribute template corresponding to the template ID, thereby dynamically generating the display picture according to the picture attribute template. The picture attribute template may include: any combination between various attributes such as a background picture, a background color, a text color, a text size and a style type, so as to ensure the diversified style of the display picture, and therefore, corresponding rules cannot be easily captured.

Certainly, when the client terminal used by the user A receives the secondary password returned by the server, a display picture may also be generated locally by the client terminal, and a generation manner is similar to that of the server (if there is no required picture attribute template stored locally, it should be downloaded from the server), which is not repeated herein.

At 416: The client terminal of user A displays the secondary password to another user, and it is assumed that a user B acquires the secondary password.

In this example embodiment, "display picture" is used as an example. The user A may store the display picture locally, and share the display picture to a social networking platform by using a social application, so that the user B views, from the social networking platform, an extraction password in the display picture shared by the user A.

Certainly, the user A may further implement displaying of the extraction password in other methods. For example, the user A may directly send the display picture to the user B, such as using instant messaging. Alternatively, the user A may further notify the user B of the extraction password in any method such as dictating, or broadcasting.

At 418: The client terminal of the user B sends a second extraction request to the server, the second extraction request including the secondary password.

At 420: The server binds the user B to an object set associated with the secondary password.

At 422: The server determines whether a preset condition is satisfied.

In this example embodiment, the preset condition may have various forms. According to different content of the preset condition, the server may have different corresponding processing manners. Several example preset conditions are described in the following. The present disclosure does not impose any restriction to the preset condition.

In an example embodiment, the preset condition may be: making statistics of the number of users corresponding to second extraction requests that have been completed, and the number of users reaches a preset number. Each time the server receives the second extraction request and completes processing, the server needs to make statistics of the number of users, and determines whether it reaches the preset number. For example, at 420, after the server binds the user B to the object set, it is considered that the second extraction request initiated by the user B has been processed, and then, the server makes statistics of the number of users, and determines whether it meets the preset condition.

In another example embodiment, the number of objects in the object set corresponding to the secondary password increases along with the increase of the number of users bound with the object set, and the preset condition may be: the number of objects corresponding to the secondary password reaches a preset number. Therefore, at 420, after the server binds the user B to the object set and the number of objects is adjusted, it is considered that the second extraction request initiated by the user B has been processed, and then, the server makes statistics of the number of users, and determines whether it meets the preset condition.

At 424A: The server distributes the object set to the user A.

In this embodiment, when the preset condition is met, the server may only distribute the objects in the object set to the user A. A distribution rule of the objects may have various forms. As an example embodiment, the server may distribute preset objects corresponding to the object set to the user A in accordance with a preset proportion. The preset proportion may be a pre-defined distribution proportion, for example, 100%. Alternatively, the preset proportion may be a random proportion generated in real time, and the random proportion may be any value between 0 and 100%.

At 424B: The server distributes the object set to all users initiating the second extraction request, such as the user B.

In this example embodiment, when the preset condition is met, the server may also distribute objects in the object set to the user A and all users initiating the second extraction request, such as the user B. The distribution rule may use a pre-defined distribution proportion or a random proportion generated in real time, but the sum of distribution proportions corresponding to all users should be less than or equal to 100%.

Figure 5:
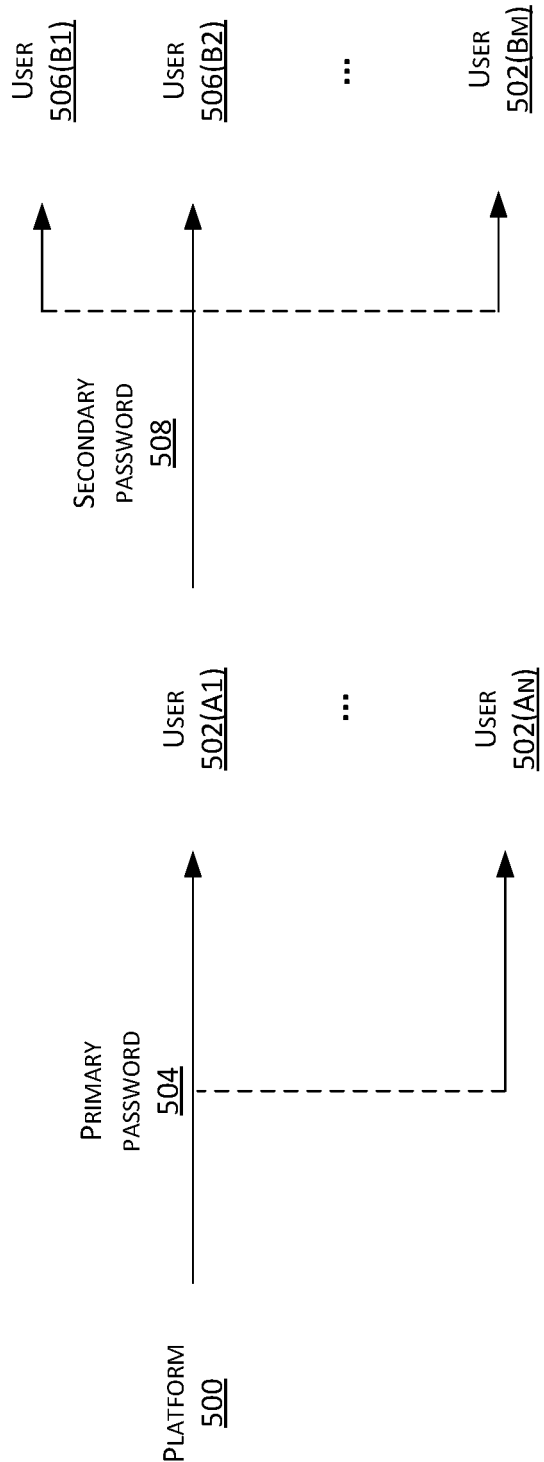
FIG. 5 is a schematic diagram of an example service object expansion according to an example embodiment of the present disclosure.

In the above example embodiment, multi-level service transmission of a platform-user An-user Bn is implemented based on the combination of the primary password and the secondary password. As shown in FIG. 5, the platform 500 may directly expand n users from a user 502(A1) to a user 502(An) with the primary password 504, and each user Ai ($1 \le i \le n$) may further conduct expansion such that the user A1 expands the service to users 506(B1), 506(B2), . . . , to 506(Bm) with the secondary password 508 so that the number of service objects increases exponentially. M and n may be any integer.

Figure 6:
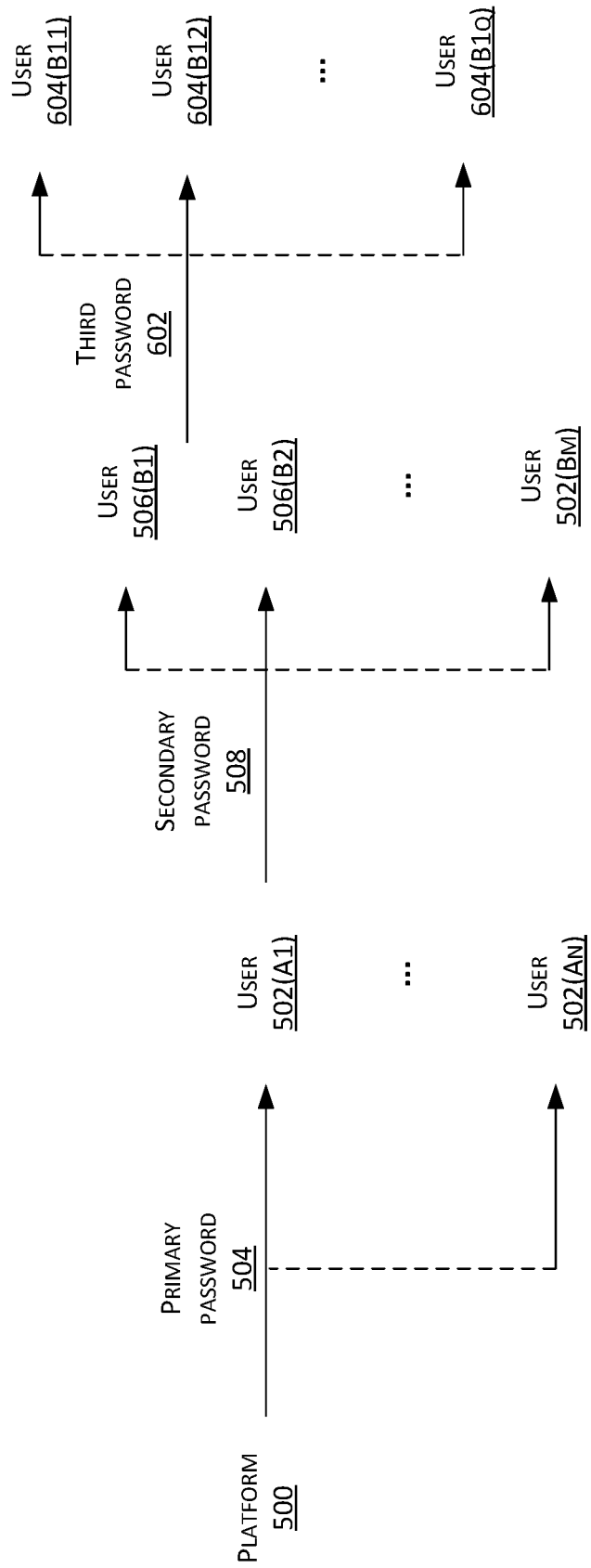
FIG. 6 is a schematic diagram of another example service object expansion according to an example embodiment of the present disclosure.

Further, a user and password structure having more levels may further be used, so as to implement the increase of the number and the efficiency. As shown in FIG. 6, by using a user 506(B1) as an example, a corresponding third password 602 may be generated for the user 506(B1), and users from a user 604(B11), 604(B12), . . . , to a user 604(B1q) are obtained for the service by the client terminal of the user B1 that displays the third password. q may be any integer. For example, at 422 shown in FIG. 4, if it is determined that the preset condition is not met, the secondary password sent to the user B may be used as a primary password, and by processing operations similar to those from 410 to 416, the user B may implement user expansion of the next level. For example, if the "secondary password" is used as the $1^{st}$ level secondary password and the "third password" is used as the $2^{nd}$ level secondary password, the method of the present disclosure may further include:

when an extraction request initiated by a user through a client terminal includes an $n^{th}$ level secondary password, binding an object set corresponding to the $n^{th}$ level secondary password to the user; and if the object set bound with the user meets the preset condition, distributing the object set; otherwise, generating an $(n+1)^{th}$ level secondary password corresponding to the object set, returning a request response including the $(n+1)t^h$ level secondary password to the user, so that the user displays the $(n+1)t^h$ level secondary password to another user, wherein $n \ge 1$.

Figure 7:
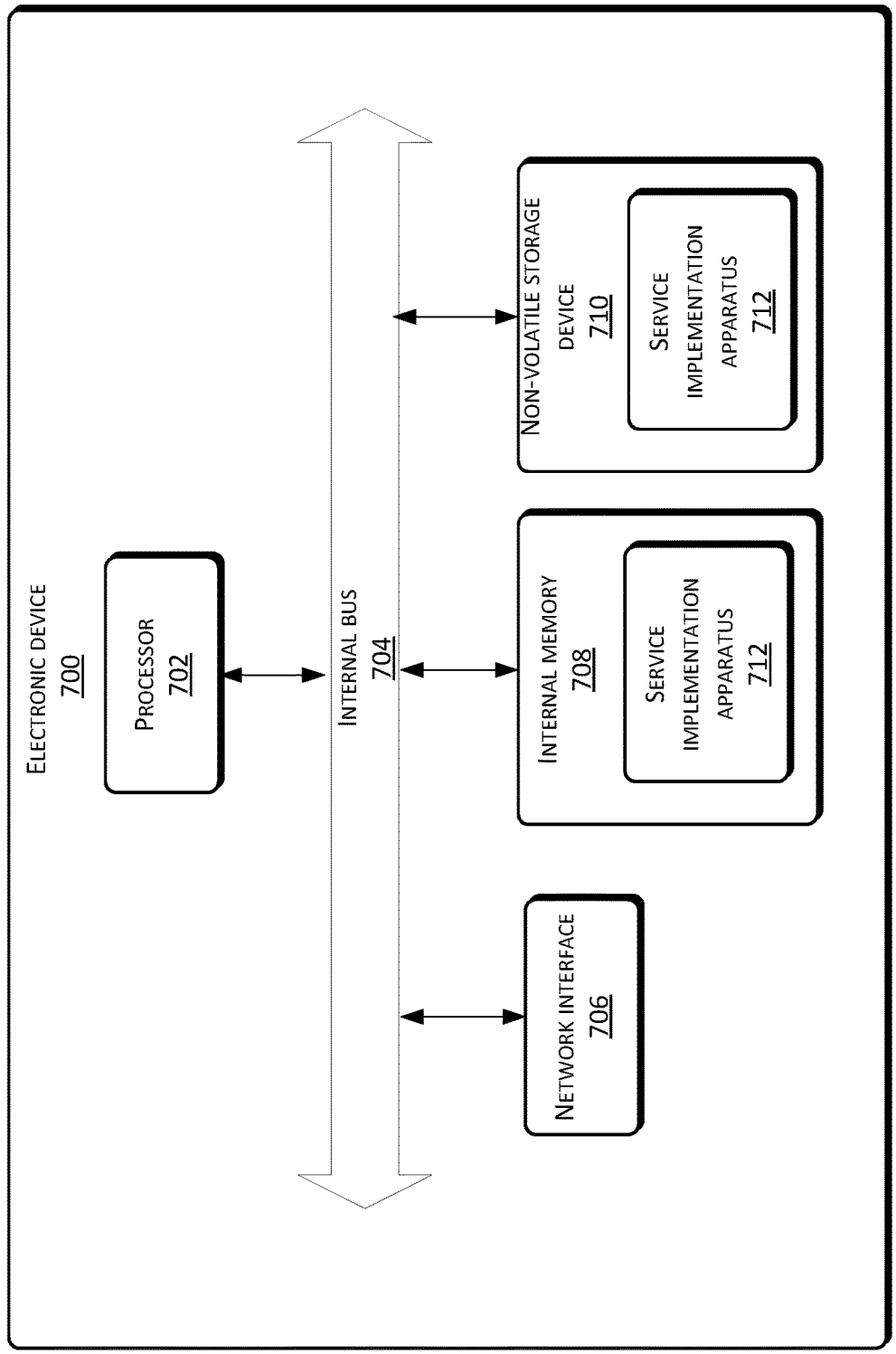
FIG. 7 is a schematic structural diagram of an example electronic device according to an example embodiment of the present disclosure.

FIG. 7 is a schematic structural diagram of an example electronic device 700 according to an example embodiment of the present disclosure. Referring to FIG. 7, on hardware level, the electronic device 700 includes one or more processors 702 or processing units, an internal bus 704, a network interface 706, one or more internal memories 708, and one or more non-volatile storage devices 710, and certainly, may further include hardware required by other services. The processors 702 read a corresponding computer program or computer-executable instructions from the non-volatile storage devices 710 to the internal memory 708 and run the computer program, thereby forming a service implementation apparatus 712 on logic level. Certainly, in addition to software implementation manner, the present disclosure does not exclude other implementation manners, such as logic devices or a combination of software and hardware. In other words, execution entities of the following processing processes are not limited to various logic units, and may also be hardware or logic devices.

Figure 8:
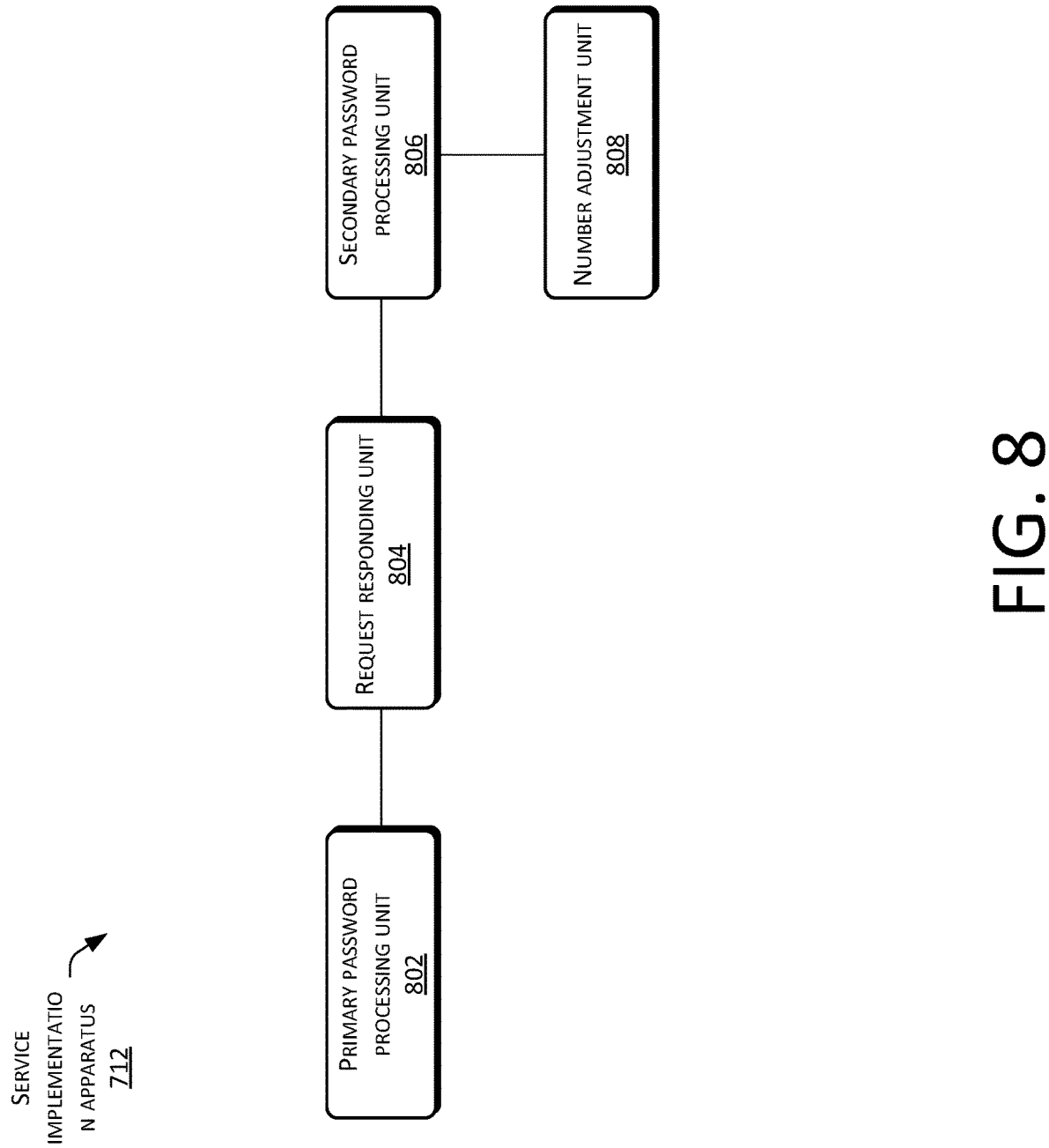
FIG. 8 is a block diagram of an example service implementation apparatus according to an example embodiment of the present disclosure.

Referring to FIG. 8, in a software implementation manner, the service implementation apparatus 712 may include a primary password processing unit 802, a request responding unit 804, and a secondary password processing unit 806 stored in the internal memories 708 and/or the non-volatile storage devices 710.

The primary password processing unit 802, when a first extraction request that includes a primary password and is initiated by a first user is received, acquires an object set corresponding to the primary password, and binds the first user to the object set.

The request responding unit 804 generates a secondary password corresponding to the object set, and returns a request response including the secondary password to the first user, so that the first user may display the secondary password to another user.

The secondary password processing unit 806, when a second extraction request that includes the secondary password and is initiated by a second user is received, performs n the process for distributing the object set to the first user according to a processing result of the second extraction request.

Optionally, the secondary password processing unit 806 may further:

when second extraction requests initiated for a preset number of second users are all processed, distribute objects in the object set to the first user and the preset number of second users; or when second extraction requests initiated for a preset number of second users are all processed, distribute objects in the object set to the first user.

Optionally, the secondary password processing unit 806 processes the second extraction request in the following methods:

binding the second user to the object set corresponding to the secondary password according to the secondary password included in the second extraction request; or processing the secondary password in the second extraction request as the primary password.

Optionally, the service implementation apparatus 712 may further include a number adjustment unit 808 that, when each second user is bound with the object set, increases the number of objects in the object set in accordance with a preset proportion.

Optionally, the primary password processing unit 802 may bind the first user to the object set in the following methods:

determining an object set group corresponding to the primary password, each object set group including at least one object set; and selecting an object set group in accordance with a predefined distribution rule, and selecting, from the selected object set group, the object set bound with the first user.

In a typical configuration, a computing device such as the platform, the server, or the client terminal includes one or more processors (CPU), an input/output interface, a network interface, and a memory.

The memory may include a volatile memory, a random access memory (RAM) and/or a non-volatile memory or the like in a computer readable medium, for example, a read only memory (ROM) or a (flash RAM). The memory is an example of the computer readable medium.

The computer readable medium includes non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, a compact disk read only memory (CD-ROM), a digital versatile disc (DVD) or other optical storages, a cassette tape, a magnetic tape/magnetic disk storage or other magnetic storage devices, or any other non-transmission medium, and can be used to store information accessed by the computing device. According to the definition of this text, the computer readable medium does not include transitory media, such as a modulated data signal and a carrier.

It should be further noted that, the term "include", "comprise" or other variations thereof are intended to cover non-exclusive including, so that a process, method, product or device including a series of elements not only includes the elements, but also includes other elements not expressly listed, or further includes inherent elements of the process, method, product or device. Without any more limitations, an element defined by "including a . . . " does not exclude that the process, method, product or device including the element further has other identical elements.

The above descriptions are only example embodiments of the present disclosure, and are not intended to limit the present disclosure. Any modification, equivalent replacement and improvement made without departing from the spirit and principle of the present disclosure shall fall within the protection scope of the present disclosure.

What is claimed is:

1. A method comprising:
    acquiring an object set corresponding to a primary password when receiving a first extraction request that includes a primary password and is initiated by a first user;
    binding the first user to the object set;
    generating a secondary password corresponding to the object set;
    returning a request response including the secondary password to the first user, the request response being operative to cause a first client terminal of the first user to display the secondary password;
    counting a received plurality of second extraction requests according to a result of processing the second extraction request, the plurality of second extraction requests each including the secondary password acquired by the respective second client terminal from the secondary password displayed by the first client terminal, and the plurality of second extraction requests being initiated by respective second users;
    determining that a preset condition is satisfied based on counting the plurality of second extraction requests; and
    distributing the object set to each respective second user;
    wherein each respective second client terminal acquires the secondary password from a respective second user viewing the secondary password displayed on the first client terminal and inputting the secondary password at an input interface of the second client terminal.

2. The method of claim 1, wherein the secondary password is displayed to the second user.

3. The method of claim 1, wherein the distributing the object set to each respective second user includes:
    distributing one or more objects in the object set to the first user and a preset number of second users after processing one or more second extraction requests that are initiated by a preset number of second users.

4. The method of claim 1, wherein the distributing the object set to each respective second user includes:
    distributing one or more objects in the object set to the first user after processing one or more second extraction requests that are initiated by a preset number of second users.

5. The method of claim 1, wherein the processing the second extraction request includes:
   binding the second user to the object set corresponding to the secondary password according to the secondary password.

6. The method of claim 1, further comprising:
   repeating each step prior to counting a received plurality of second extraction requests, except that the secondary password is substituted for the primary password, the second user is substituted for the first user, and a tertiary password is substituted for the secondary password.

7. The method of claim 1, wherein the processing the second extraction request includes:
   increasing a number of objects in the object set in accordance with a preset proportion, when the second user is bound with the object set.

8. The method of claim 1, wherein the binding the first user to the object set includes:
   determining one or more object set groups corresponding to the primary password, each object set group including at least one object set;
   selecting an object set group in accordance with a predefined distribution rule; and
   selecting, from the selected object set group, the object set bound with the first user.

9. The method of claim 8, wherein:
   the object set group is a red envelope group in electronic form;
   the object set is one or more red envelopes in electronic form included in each envelope group; and
   the object is a money gift in electronic form in each red envelope.

10. A device comprising:
    one or more processors; and
    one or more memories stored thereon computer-executable instructions, executable by the one or more processors, to cause the one or more processors to perform acts comprising:
    acquiring an object set corresponding to a primary password when receiving a first extraction request that includes a primary password and is initiated by a first user;
    binding the first user to the object set;
    generating a secondary password corresponding to the object set;
    returning a request response including the secondary password to the first user, the request response being operative to cause a first client terminal of the first user to display the secondary password;
    counting a received plurality of second extraction requests according to a result of processing the second extraction request, the plurality of second extraction requests each including the secondary password acquired by the respective second client terminal from the secondary password displayed by the first client terminal, and the plurality of second extraction requests being initiated by respective second users;
    determining that a preset condition is satisfied based on counting the plurality of second extraction requests; and
    distributing the object set to each respective second user;
    wherein each respective second client terminal acquires the secondary password from a respective second user viewing the secondary password displayed on the first client terminal and inputting the secondary password at an input interface of the second client terminal.

11. The device of claim 10, wherein the secondary password is displayed to the second user.

12. The device of claim 10, wherein the distributing the object set to each respective second user includes:
    distributing one or more objects in the object set to the first user and a preset number of second users after processing one or more second extraction requests that are initiated by a preset number of second users.

13. The device of claim 10, wherein the distributing the object set to each respective second user includes:
    distributing one or more objects in the object set to the first user after processing one or more second extraction requests that are initiated by a preset number of second users.

14. The device of claim 10, wherein the processing the second extraction request includes:
    binding the second user to the object set corresponding to the secondary password according to the secondary password.

15. The device of claim 10, further comprising:
    repeating each step prior to counting a received plurality of second extraction requests, except that the secondary password is substituted for the primary password, the second user is substituted for the first user, and a tertiary password is substituted for the secondary password.

16. The device of claim 10, wherein the processing the second extraction request includes:
    increasing a number of objects in the object set in accordance with a preset proportion, when the second user is bound with the object set.

17. The device of claim 10, wherein the binding the first user to the object set includes:
    determining one or more object set groups corresponding to the primary password, each object set group including at least one object set;
    selecting an object set group in accordance with a predefined distribution rule; and
    selecting, from the selected object set group, the object set bound with the first user.

18. The device of claim 17, wherein:
    the object set group is a red envelope group in electronic form;
    the object set is one or more red envelopes in electronic form included in each envelope group; and
    the object is a money gift in electronic form in each red envelope.

19. One or more memories stored thereon computer-executable instructions, executable by one or more processors, to cause the one or more processors to perform acts comprising:
    acquiring an object set corresponding to a primary password when receiving a first extraction request that includes a primary password and is initiated by a first user;
    binding the first user to the object set;
    generating a secondary password corresponding to the object set;
    returning a request response including the secondary password to the first user, the request response being operative to cause a first client terminal of the first user to display the secondary password;
    counting a received plurality of second extraction requests according to a result of processing the second extraction request, the plurality of second extraction requests each including the secondary password acquired by the respective second client terminal from the secondary password displayed by the first client terminal, and the plurality of second extraction requests being initiated by respective second users;

determining that a preset condition is satisfied based on counting the plurality of second extraction requests; and distributing the object set to each respective second user;

wherein each respective second client terminal acquires the secondary password from a respective second user viewing the secondary password displayed on the first client terminal and inputting the secondary password at an input interface of the second client terminal.

20. The one or more memories of claim 19, wherein:

the object set is one or more red envelopes in electronic form; and the object is a money gift in electronic form in each red envelope.

* * * * *